United States Patent Office 3,053,822
Patented Sept. 11, 1962

3,053,822
PROCESS FOR POLYMERIZING VINYL ESTERS WITH A CATALYST SYSTEM OF AN ALUMINUM ALKYL COMPOUND AND A KETONE
Calvin J. Benning, Clarksville, Md., assignor to W. R. Grace & Co., New York, N.Y., a corporation of Connecticut
No Drawing. Filed Apr. 11, 1961, Ser. No. 102,136
5 Claims. (Cl. 260—89.1)

This invention relates to a novel polymerization process. More particularly, it is directed to the polymerization of vinyl esters.

Summarily, this invention involves polymerizing vinyl esters by subjecting said esters preferably in the presence of an inert solvent to the action of a catalyst comprising an aluminum alkyl compound, having the formula:

wherein R' is an alkyl or Cl and R is an alkyl, all of said alkyls having 1 to 8 carbon atoms, and a ketone having the general formula

wherein R and R' are alkyl groups containing 1 to 8 carbon atoms but not necessarily the same alkyl groups.

The use of aluminum alkyls in recent years for polymerizing olefin polymers is well known in the art—see U.S. Patent 2,699,457, issued to Ziegler et al. The effectiveness of aluminum alkyls and a ketone as a catalyst to polymerize the aforesaid vinyl monomers is surprising since it is known that oxygen containing impurities, e.g., moisture, air, carbon dioxide, are well known poisons for aluminum alkyls in the polymerization of polyolefins. See for example, U.S. Patent 2,781,410, issued to Ziegler et al. Moreover, it is remarkable that a catalyst formed by the addition of a ketone to an aluminum alkyl will polymerize the monomers (e.g., vinyl acetate) of the instant invention, in view of the fact that polymerization of monomers such as vinyl acetate has not been accomplished with the Ziegler catalysts. See Linear and Stereoregular Addition Polymers, Gaylord and Mark, p. 298 (Interscience Publishers, 1959).

The reason for this synergistic effect of the catalyst components is not known. Results indicate that the catalyst components should preferably be added to the monomer at low temperatures in order to obtain optimum polymer yields. For any given polymerization reaction temperature, an initially lower temperature for the catalyst addition step will result in higher polymer yields in comparison to the catalyst addition and the polymerization reaction being performed at the same temperature. Preferably the catalyst addition step is carried out at a temperature below 0° C.; the lower limit being the freezing point of the monomer or monomer solution to be polymerized.

The temperature of the polymerization step at atmospheric pressure is limited by the component having the lowest boiling point. Obviously higher temperatures can be employed if superatmospheric pressure is used. The polymerization step is ordinarily performed at a temperature in the range from minus 40 to plus 80° C. The fact that the catalyst system of the instant invention is effective under a broad range of temperatures, is surprising. The customary free radical type initiators (peroxides, such as benzoyl peroxide, azonitrile such as azoisobutyronitrile, redox-catalyst combinations such as cumene hydroperoxide with ferrous salts, and many others) are only effective at temperatures above 0–5° C.

Only a few chemical initiating systems are known which polymerize the common vinyl monomers down to minus 20° C. and then very slowly. Only cationic Friedel-Crafts type initiators such as aluminum chloride, boron trifluoride, and the like are known to polymerize any monomer at temperatures as low as minus 40° C. Their action is restricted to substituted alkenes, such as isobutylene; however, they do not polymerize monomers such as vinyl acetate.

Low temperature polymerization affords many beneficial results including higher molecular weight polymer. Additionally, due to less chain transfer at low temperatures, polymers are less branched and therefore possess a higher degree of crystallinity resulting in a higher softening point. Frequently, also, monomers will tend to add to the growing chain at low temperature in a sterically preferred configuration leading to stereoregular polymers. Such polymers are usually highly crystalline even when the corresponding randomly polymerized material is amorphous.

The polymerization reaction of the instant invention is ordinarily performed at atmospheric pressure. Superatmospheric pressure can be employed if equipment able to withstand same is utilized.

We have not ascertained the mechanism of this novel polymerization, i.e., whether it is free radical, ionic or a combination thereof, nor do we wish to be bound by any theory. Suffice it to say that polymerization of the vinyl esters occurs in the presence of a catalyst consisting essentially of an aluminum alkyl and a ketone under conditions explained more fully hereinafter.

Although the polymerization is operable in the absence of a solvent the polymerization is preferably carried out in the presence of a solvent. The solvent used in the practice of this invention should be one which is inert and does not interfere with either the monomer to be polymerized, the catalyst employed or the growing polymer chain. The preferred inert solvents are dry aliphatic hydrocarbon solvents in the alkane and cycloalkane groups. Examples of the preferred solvents are n-pentane, n-hexane, n-heptane, n-octane, n-nonane, and cyclohexane.

The mole ratio of the catalyst components is not critical. An aluminum alkyl compound:ketone mole ratio of 1 to 10:1 is operable preferably 1:1 is employed.

The amount of aluminum alkyl compound necessary to effect a polymerization is not critical and may be varied considerably. Relatively small amounts are operable to form relatively large amounts of polymer. In general, a practical range is 0.001 to 1.0 mole of aluminum alkyl compound per mole of vinyl ester monomer charged. Even larger amounts of catalyst are operable but occasionally present a purification problem.

In performing the instant invention, the catalyst is transferred to the polymerization reactor under an inert atmosphere to insure that it does not react with oxygen moisture or other contaminants. This step is conveniently performed in what is referred to herein as a dry box in which a slight pressure of an inert atmosphere, e.g., argon or other noble gas is maintained. The polymerization reaction is also performed in an oxygen free atmosphere to insure that oxygen does not contaminate the reaction in any way.

The following example will more fully explain the present invention but is in no way deemed as limiting its scope.

Example 1

To a 1000 ml. glass polymerization vessel in which the air has been displaced with high purity anhydrous argon was added 300 ml. of deoxygenated anhydrous n-heptane, 93 ml. vinyl acetate (1 mole), distilled and stored under argon, and 4 cc. deoxygenated anhydrous acetone. The reactor was cooled to minus 25° C. by means of a Dry Ice bath and maintained under a continuous argon blanket at atmospheric pressure. At minus 25° C., 200 ml. of anhydrous deoxygenated n-heptane containing 37 ml. of triethylaluminum solution in n-heptane (0.185 gram triethylaluminum/ml. solution) was added. A slight exotherm was noted after the addition of the triethyl aluminum. The mixture was agitated for 8 hours at minus 25° C. during which time small amounts of polymer began precipitating out on the walls of the polymerization vessel. The reaction mixture was then allowed to warm to room temperature (25° C.) over a 17-hour period. The reaction vessel was opened and the precipitated polymer was filtered, washed in a blender with water, and dried. The dried polyvinyl acetate product weighed 8 grams equal to a 9% conversion of the monomer reactant.

*Example 2*

The procedure and reactants of Example 1 were used except that 90 ml. of vinyl butyrate (1 mole), distilled and stored under argon, and 4 cc. of anhydrous deoxygenated methyl ethyl ether were substituted for the vinyl acetate and diethyl ether respectively. After agitating the reaction for 8 hours at minus 25° C. during which time polymer began precipitating out, the reaction mixture was allowed to warm to room temperature over a 12-hour period. A good yield of solid polyvinyl butyrate was recovered by the procedure of Example 1.

*Example 3*

The procedure and reactants of Example 1 were used except that 92 ml. of vinyl propionate (1 mole), distilled and stored under argon, and 4 cc. of deoxygenated anhydrous dibutyl ether were substituted for the vinyl acetate and diethyl ether respectively. After 8 hours at minus 25° C. during which time polymer precipitated out of the solution the reaction mixture was allowed to warm to room temperature (25° C.) over a 12-hour period. A good yield of solid polyvinyl propionate was recovered by the procedure of Example 1.

*Example 4*

The procedure and reactants of Example 1 were used except that 200 ml. anhydrous deoxygenated n-heptane containing 35 ml. of diethyl aluminum chloride solution in n-heptane (0.20 gram diethyl aluminum chloride/ml. solution) was substituted for the 200 ml. of anhydrous deoxygenated n-heptane containing 37 ml. of triethylaluminum solution in n-heptane. The reaction was continued for 8 hours at minus 25° C. followed by a 10-hour period during which the reaction mixture was allowed to warm to room temperature. A good yield of solid polyvinyl acetate was recovered.

I claim:
1. The process of homopolymerizing vinyl acetate which comprises subjecting vinyl acetate at a temperature in the range from minus 40 to plus 80° C. in an oxygen-free atmosphere to the action of a catalyst consisting essentially of an aluminum alkyl compound of the formula:

wherein R' is a member of the group consisting of alkyl and halide and R is an alkyl, all of said alkyls containing 1 to 8 carbon atoms, and a ketone having the general formula

wherein R and R' are alkyl groups containing 1 to 8 carbon atoms, the mole ratio of said aluminum alkyl compound:ketone being in the range 1–10:1 respectively.

2. The process according to claim 1 wherein the polymerization is carried out in the presence of an inert hydrocarbon solvent.

3. The process according to claim 2 wherein the inert hydrocarbon solvent is n-heptane.

4. The process according to claim 1 wherein the ketone is acetone.

5. The process of homopolymerizing a vinyl ester monomer which comprises subjecting said monomer at a temperature in the range from minus 40 to plus 80° C. in an oxygen-free atmosphere to the action of a catalyst consisting essentially of an aluminum alkyl compound of the formula:

wherein R' is a member of the group consisting of alkyl and halide and R is an alkyl, all of said alkyls containing 1 to 8 carbon atoms, and a ketone having the general formula

wherein R and R' are alkyl groups containing 1 to 8 carbon atoms, the mole ratio of said aluminum alkyl compound:ketone being in the range 1–10:1 respectively.

References Cited in the file of this patent

UNITED STATES PATENTS 2,881,156     Pilar et al.               Apr. 7, 1959

FOREIGN PATENTS 819,291     Great Britain            Sept. 2, 1959